United States Patent [19]

Shiota et al.

[11] Patent Number: 5,125,185

[45] Date of Patent: Jun. 30, 1992

[54] WEATHER STRIP FOR A DOOR BELT-MOLDING

[75] Inventors: Akihito Shiota, Toyota; Yutaka Watanabe, Nagoya; Kiyotaka Nakai, Chita, all of Japan

[73] Assignee: Aisin Seiki Kabushiki Kaisha, Japan

[21] Appl. No.: 676,694

[22] Filed: Mar. 29, 1991

[30] Foreign Application Priority Data

Mar. 31, 1990 [JP] Japan ............... 2-34296[U]

[51] Int. Cl.$^5$ ................................ E05F 11/38
[52] U.S. Cl. ................................ 49/377; 49/490; 49/485
[58] Field of Search ............ 49/377, 374, 375, 485, 49/490, 496

[56] References Cited

U.S. PATENT DOCUMENTS

| | | | |
|---|---|---|---|
| 4,472,469 | 9/1984 | Thies | 49/496 X |
| 4,617,220 | 10/1986 | Ginster | 49/490 X |
| 4,701,376 | 10/1987 | Hermann et al. | 49/490 X |
| 4,843,759 | 7/1989 | Kisanuki et al. | 49/490 X |
| 4,957,301 | 9/1990 | Clay et al. | 49/485 X |
| 5,001,867 | 3/1991 | Dupuy | 49/377 X |
| 5,005,317 | 4/1991 | Saint-Louis Augustin et al. | 49/377 X |

FOREIGN PATENT DOCUMENTS 2183707 6/1987 United Kingdom ........... 49/485

Primary Examiner—Renee S. Luebke
Assistant Examiner—Jerry Redman
Attorney, Agent, or Firm—Finnegan, Henderson, Farabow, Garrett & Dunner

[57] ABSTRACT

A weather strip for a door belt-molding disposed for sliding contact with a window glass to prevent water leakage between the door belt-molding and the window glass, comprising a root portion of which at least one portion is made of a material having a high coefficient of elasticity and resistance to permanent strain. The preferred materials are ethylene propylene rubber or a thermoplastic elastomer resin.

6 Claims, 2 Drawing Sheets

WEATHER STRIP FOR A DOOR BELT-MOLDING

BACKGROUND OF THE INVENTION

1. Field of the Invention

The present invention relates to a weather strip for a door belt-molding and, in particular, to a weather strip which is intended to be retained in contact with a slidably movable window glass.

2. Description of the Related Art

FIG. 4 of the accompanying drawings illustrates the cross-sectional configuration of a well known conventional vehicular door belt-molding designed for placement along at least the bottom edge of a window opening to serve both as a finishing cover for the door edge at the periphery of the opening, and as a weather strip or seal between the door structure and a window glass movable in the plane of the door to and from a position closing the opening. A weather strip 1 is shown in an initial or relaxed condition relative to the closed position of a window glass 2, and carries on the side thereof facing the window glass 2, a flocked portion 3. The weather strip 1 extends from a root portion a through which it is connected as an integral portion of a door belt-molding 4 extending about a stainless steel core 5.

In this type of weather strip, movement of the window glass 2 to and from its closed position results in sliding contact with the flocked portion 3, and flexure of the weather strip 1 at the root portion a in a manner to retain the flocked portion under a yieldable bias against the window glass. The weather strip 1 thus functions to remove foreign matter such as water droplets, dust, etc. from the window glass 2 during up and down sliding movement of the window glass 2.

The weather strip 1, including the root portion a thereof, is made of a vinyl chloride having adequate elasticity to permit flexure from the position illustrated to a position in which the flocked portion lies against the facing surface of the window glass 2. The vinyl chloride material of the weather strip 1 has good properties for ensuring continuous fluid-tight contact with the glass but tends to develop a permanent strain when flexed under a continuously applied force. As a result, the pressure exerted by the window glass 2 acts on the root portion a to develop a permanent strain so that, with passage of time, the biasing force, which retains the weather strip 1 against the window glass 2, is decreased. Accordingly, function of the flocked portion 3 for removing water and other foreign matter from the window glass 2 is diminished, if not eliminated. Thus, the conventional weather strip 1 leads to such drawbacks as streaking and other impairments to vision through the window glass.

SUMMARY OF THE INVENTION

It is therefore a primary object of the present invention to provide a weather strip for a door belt-molding without the aforementioned drawbacks.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention includes a weather strip for a door belt-molding and located so as to contact with a movable window glass to prevent water leakage between the door belt-molding and the window glass, the weather strip being joined to the belt-molding by a root portion of which at least one portion is made of a material having a higher coefficient of elasticity and greater resistance to permanent strain than the material of the weather strip and door belt-molding.

The accompanying drawings, which are incorporated in and constitute a part of this specification, illustrate one embodiment of the invention and, together with the description, serve to explain the principles of the invention.

BRIEF DESCRIPTION OF THE DRAWINGS

The above and other objects, features and advantages of the present invention will become more apparent and more readily appreciated from the following detailed description of preferred exemplary embodiments of the present invention, taken in connection with the accompanying drawings, in which.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
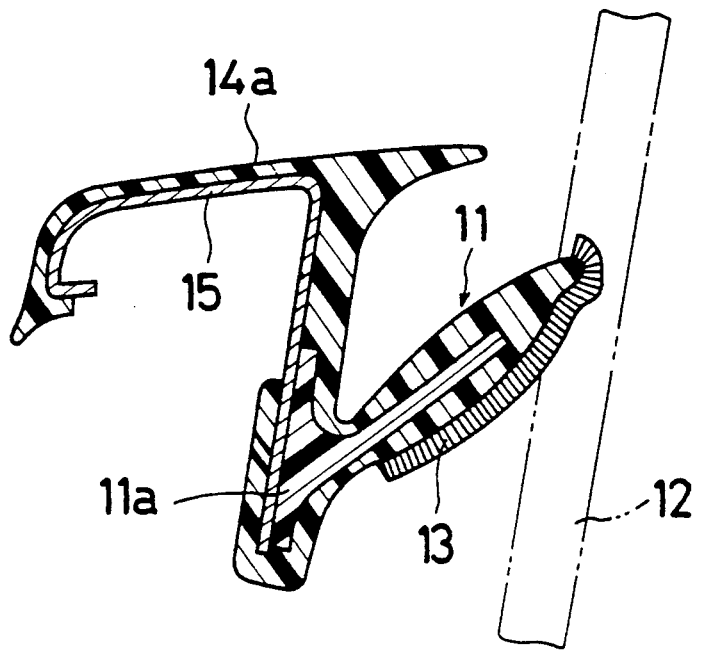
FIG. 1 is a cross-sectional view showing a weather strip of a first preferred embodiment according to the present invention.

In FIG. 1 of the drawings, an embodiment of the invention is illustrated in which the reference number 11 designates a weather strip which is integral with a door belt-molding 14a having a core portion 15 made of stainless steel. A flocked portion 13 is provided on the weather strip 11 at a location to make slidable contact with a window glass 12.

Figure 4:
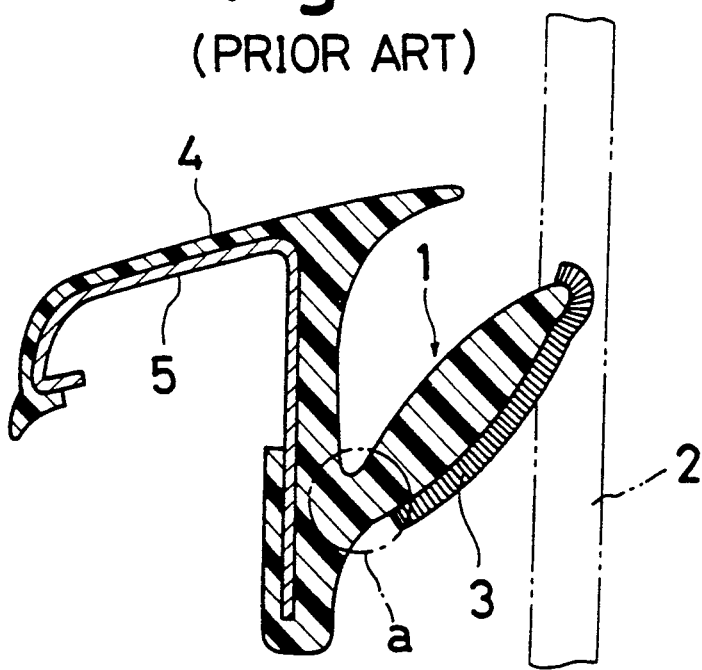
FIG. 4 is a view similar to FIG. 1, however, showing a conventional weather strip.

The main body portion of the integrated weather strip 11 and door belt-molding 14a, in the embodiment of FIG. 1, is defined in cross section by a continuous outer layer-like portion formed of a first material, preferably vinyl chloride, having the same properties of those described with reference to FIG. 4. The flexible root portion at which the weather strip 11 joins with the door belt-molding 14a, includes a core-like portion 11a of a second material having a high coefficient of elasticity and resistance to permanent strain. More particularly, the second material has a higher resistance to permanent strain then the first material. Examples of materials preferred for the portion 11a are ethylene propylene rubber (EPDM) and a thermoplastic elastomer resin of a type available commercially from Bayer Corporation and designated by the Registered Trademark "DESMOPAN".

Figure 2:
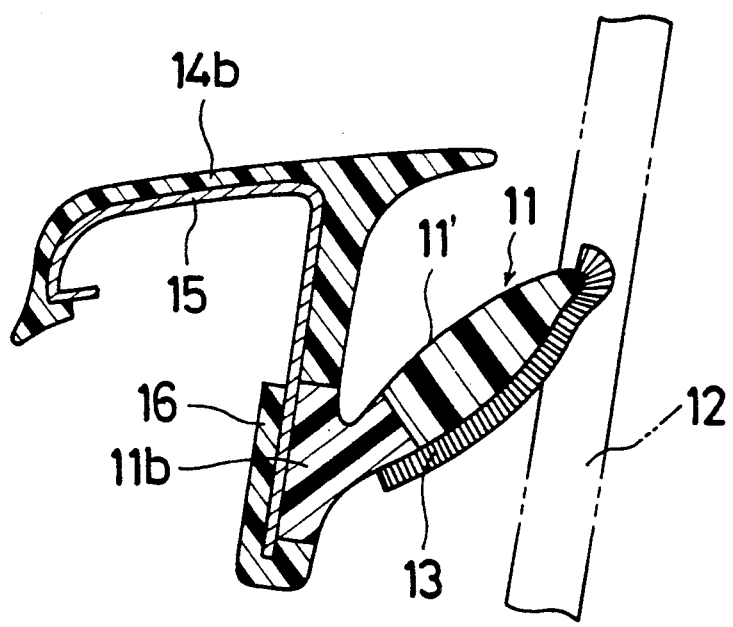
FIG. 2 is a view similar to FIG. 1, however, showing a weather strip of a second preferred embodiment according to the present invention.

In FIG. 2, a second embodiment of the invention is illustrated in which the weather strip 11 is formed as a fin component 11' connected to a door belt-molding 14b having a stainless steel core 15. A lower end portion 16 is secured about the core 15 and, with the door belt-molding 14b and weather strip 11, defines essentially the same exterior cross sectional configuration as that described with reference to FIG. 1. Also as in FIG. 1, the weather strip fin 11', lower component 16 and door belt-molding 14b are formed of vinyl chloride having the properties previously described. In this embodiment, however, the entire root portion at which the fin 11' is joined with the remaining components of the main body portion of the integrated weather strip and door belt-molding, is formed of plastic material having a high coefficient of elasticity and resistance to permanent strain, such as EPDM or the afore-mentioned thermoplastic elastomer resin.

Figure 3:
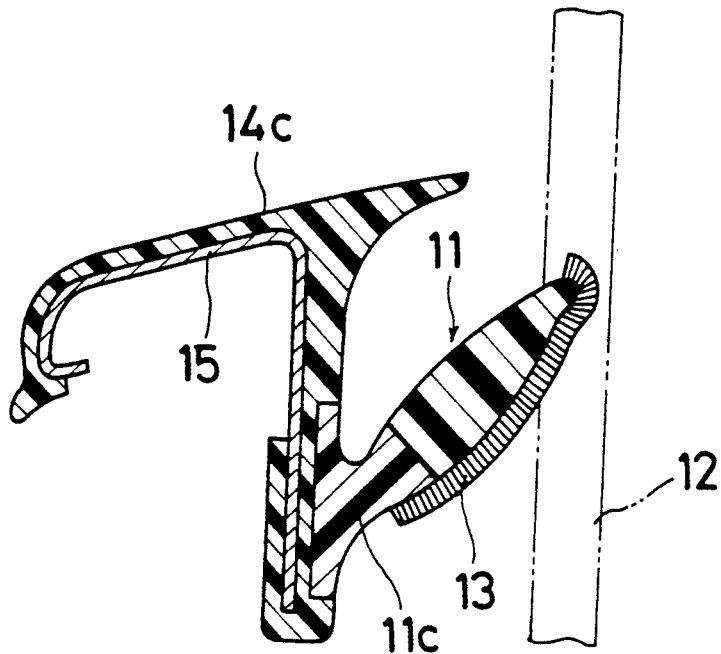
Fig 3 is a view similar to FIG. 1, however, showing a weather strip of a third preferred embodiment according to the present invention.

In a third embodiment illustrated in FIG. 3 of the drawings, an integrated weather strip 11 and door belt-molding 14c, identical in exterior cross section to the previous embodiments, is shown. This embodiment is very similar to the embodiment of FIG. 2 with the exception that the root portion of the weather strip formed of EPDM or thermoplastic elastomer resin is of a configuration so that the material constituting the root portion 11c is spaced from the stainless steel core by the vinyl chloride of the door belt-molding 14c. This embodiment avoids any problems associated with the ability of the EPDM or thermoplastic elastomer resin adhering with the stainless steel core 15.

In each of the described three embodiments, the weather strip root portion is made of a material having a high resistance to permanent strain. Accordingly, the pressure acting on the root portion of the weather strip by the moveable window glass does not result in plastic deformation at the root portion. Consequently, the surface pressure of the weather strip with the window glass is maintained together with the cleaning function of the strip on the window glass.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An integrated door belt-molding and weather strip having in cross section a door edge belt-molding portion adapted to be fixed to and cover a door edge of an opening closed by a window glass movable past said door edge to close and open the opening, a fin portion, and a root portion joining said fin portion to said door edge belt-molding portion, said fin portion projecting from said door edge belt-molding portion to be biased into sealing and sliding engagement with the movable window glass by elastic flexure of said root portion, said door edge belt-molding portion and said fin portion being of a first material to serve the functions of said door edge belt-molding portion and to ensure continuous fluid-tight contact of said fin portion with the movable window glass, and said root portion including at least a part formed of a second material having the physical properties of ethylene propylene rubber to provide a high coefficient of elasticity and resistance to permanent strain greater than the first material.

2. The integrated door belt-molding and weather strip recited in claim 1 wherein said first material comprises vinyl chloride.

3. The integrated door belt-molding and weather strip recited in claim 1 wherein said second material comprises ethylene propylene rubber.

4. The integrated door belt-molding and weather strip recited in claim 1 wherein said second material comprises thermoplastic elastomer resin.

5. The integrated door belt-molding and weather strip recited in claim 1, wherein said root portion comprises a core of said second material enveloped by said first material.

6. The integrated door belt-molding and weather strip recited in claim 1, wherein said root portion consists essentially of said second material and is joined at one end to said fin and at the other end thereof to said body portion.

* * * * *